United States Patent
Schaade

(10) Patent No.: US 8,223,939 B2
(45) Date of Patent: Jul. 17, 2012

(54) METHOD, COMMUNICATION TERMINAL AND COMMUNICATION SYSTEM FOR DISPLAYING A NAME ASSIGNED TO A TELEPHONE NUMBER WHEN A CONNECTION IS ESTABLISHED

(75) Inventor: Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1153 days.

(21) Appl. No.: 11/991,979

(22) PCT Filed: Aug. 25, 2006

(86) PCT No.: PCT/EP2006/065669
§ 371 (c)(1),
(2), (4) Date: Mar. 13, 2008

(87) PCT Pub. No.: WO2007/033883
PCT Pub. Date: Mar. 29, 2007

(65) Prior Publication Data
US 2009/0074165 A1 Mar. 19, 2009

(30) Foreign Application Priority Data
Sep. 21, 2005 (DE) .......................... 10 2005 045 113

(51) Int. Cl.
H04M 1/56 (2006.01)
H04M 15/06 (2006.01)
H04M 1/00 (2006.01)
H04M 3/42 (2006.01)

(52) U.S. Cl. ............... 379/142.07; 379/156; 379/207.15

(58) Field of Classification Search ............. 379/142.06, 379/207.15, 266.01, 93.23, 142.01, 142.07, 379/156
See application file for complete search history.

(56) References Cited

U.S. PATENT DOCUMENTS

| | | | |
|---|---|---|---|
| 6,707,897 B2 * | 3/2004 | Nishida | 379/188 |
| 6,732,188 B1 * | 5/2004 | Flockhart et al. | 709/245 |
| 6,760,727 B1 * | 7/2004 | Schroeder et al. | 707/10 |
| 2003/0210771 A1 * | 11/2003 | Broussard et al. | 379/88.23 |

FOREIGN PATENT DOCUMENTS

| | | |
|---|---|---|
| EP | 0 876 038 A2 | 11/1998 |
| GB | 2 381 992 A | 5/2003 |

OTHER PUBLICATIONS

Oracle Coproration: "Oracle Advanced Inbound Telephony 11i data sheet", online, May 2005, pp. 1-6, XP002413418, found in the internet: URL: www.oracle.com/applications/crm/interactioncenter/11510_ai_ds.pdf found on Jan. 5, 2007, the whole document.
Oracle Corporation: "Oracle Teleservice 11I data sheet", online, May 2005, pp. 1-6, XP002413409, found in the internet: URL: www.oracle.com/applications/service/11i10_ots_ds.pdf found on Jan. 8, 2007, the whole document.

* cited by examiner

*Primary Examiner* — Quoc D Tran

(57) ABSTRACT

A displayed name is assigned to a telephone number on a first communication terminal of a communication system, the telephone number of a second communication being detected on the first terminal or the communication system during a connection between the first and second terminals. The displayed name is transmitted to the communication system and stored along with the telephone number once the displayed name has been input.

20 Claims, 1 Drawing Sheet

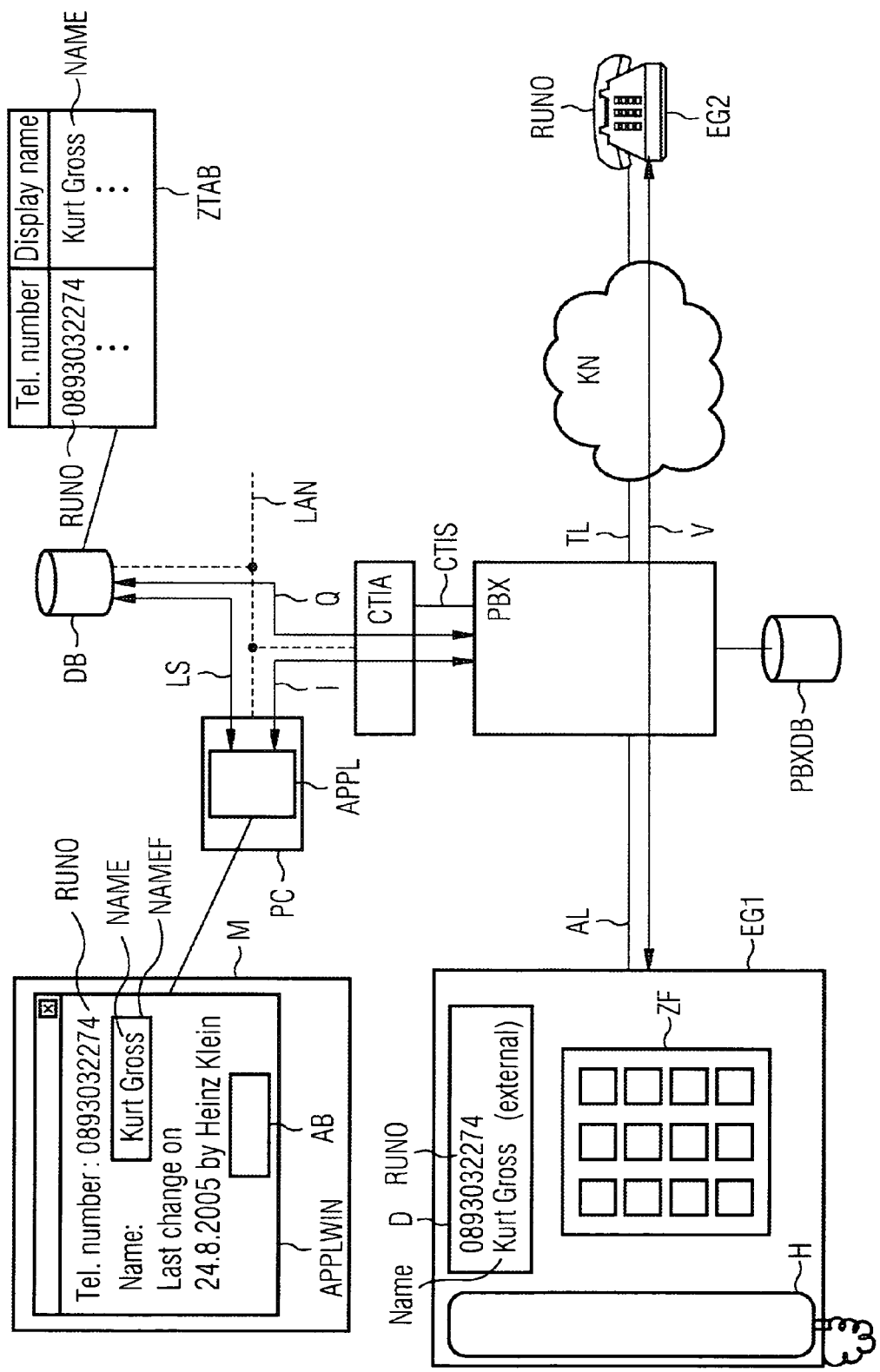

METHOD, COMMUNICATION TERMINAL AND COMMUNICATION SYSTEM FOR DISPLAYING A NAME ASSIGNED TO A TELEPHONE NUMBER WHEN A CONNECTION IS ESTABLISHED

CROSS REFERENCE TO RELATED APPLICATIONS

This application is the US National Stage of International Application No. PCT/EP2006/0065669, filed Aug. 25, 2006 and claims the benefit thereof. The International Application claims the benefits of German application No. 10 2005 045 113.6 DE filed Sep. 21, 2005, both of the applications are incorporated by reference herein in their entirety.

FIELD OF INVENTION

The invention relates to displaying a name assigned to a telephone number when a connection is established.

BACKGROUND OF INVENTION

In modern communication systems for voice a telephone number and/or a name of a communication partner can usually be shown on the display of a telephone for incoming and outgoing calls.

To transfer the telephone number, in ISDN-based protocols (ISDN: Integrated Services Digital Network) a method known as CLIP (Calling Line Identification Presentation) is used to display a caller's telephone number. Frequently however a name assigned to a subscriber is not transferred at the same time.

For terminals in private networks the terminals and their telephone numbers are frequently assigned names and configured by the private branch exchange system. Within the framework of a connection between two terminals of the private branch exchange the configured name of the respective communication partner is additionally transferred to the terminals and is displayed on the respective terminals. If on the other hand a connection is established via a trunk line from an external communication partner of another private or public network to an internal communication partner within the private branch exchange, the private branch exchange cannot usually display the name of the communication partner external to the private branch exchange, since only data for the terminals of the private branch exchange is configured in the private branch exchange.

Furthermore modern terminals frequently have an internal memory for displaying the name of a communication partner, in which an assignment of telephone number to name is stored, with these types of assignment being entered manually by the user of the terminal. For an incoming call the name associated with the telephone number signaled can be determined by these types of terminal and can be displayed on a screen of the terminal. This method is mostly implemented for mobile radio terminals of a mobile radio network or ISDN terminals of a public telephone network, since only the telephone number is usually transferred in these networks with no transfer of the name.

SUMMARY OF INVENTION

A disadvantage of the existing communication systems and especially terminals is that a subscriber is frequently shown the telephone number of a communication partner but not the name of the communication partner. A further disadvantage is that displaying the name involves a very high configuration overhead for the terminal since frequently the name data of all possible communication partners has to be configured and updated for each available terminal.

The object of the invention is to improve the display of address information with subscriber-individual and/or terminal-individual information.

This object is achieved by a method, by a communication system, as well as by a communication terminal with the features of the independent claims.

Advantageous embodiments and developments of the invention are specified in the dependent claims.

In the inventive method for assigning subscriber-individual and/or terminal-individual information to address information at a first communication terminal of a communication system, within the framework of a connection between a second communication terminal and the first communication terminal, the address information of second communication terminal is detected at the first communication terminal or at the communication system. Furthermore, after subscriber-individual and/or terminal-individual information has been entered, this is transferred to the communication system and is stored in the communication system together with the address information, especially in a central communication system assignment table.

The second communication terminal in particular represents a communication system-external communication terminal, which is part of a further private or public communication system or communication system. The address information is especially telephone number information to be assigned uniquely to a subscriber or a communication terminal, which will be transmitted for example by means of CLIP between the communication systems. For example the address information, depending on the communication terminal or the communication system, is telephone number information, an IP address (IP: Internet Protocol) and/or an E.164 number in accordance with the associated ITU-T Recommendation (ITU-T: International Telecommunication Union standardization group). The subscriber-individual and/or terminal-individual information is for example a name of a subscriber assigned to the second communication terminal or an identifier or designation of the second communication terminal and can be a string of text, an electronic graphic or a picture file, acoustic information such as a voice recording or a sequence of tones or a combination and/or sequence of said information.

The communication system is especially a telephone switching system, a router and/or a gatekeeper or an arrangement of these systems and assigned communication terminals. The second communication terminal is especially a communication terminal external to the communication system, which is not administered and/or managed by the communication system. The address information is preferably detected in the communication system within the framework of signaling the connection—especially of connection setup signaling—or during the established connection. The detected subscriber-individual and/or terminal-individual information for address information is preferably assigned in the communication system during the signaling of the connection, during the established connection or after ending of the connection.

The invention is advantageous in that the storage of the assignment of address information and subscriber-individual or terminal-individual information in the assignment table using communication-system-specific or especially central storage enables the stored data in the communication system to be made available for all its communication terminals for interrogation.

In an advantageous development of the invention, within the framework of a connection setup between the second communication terminal and a further communication system-internal communication terminal, after a detection of the address information in the communication system, the assigned stored subscriber-individual and/or terminal-individual information can be read and transferred to the further communication terminal.

In such cases it is especially advantageous for many or all communication system-internal communication terminals to be able to access the same stored assignment and thus in connections—executed after the assignment of the information—to or from the second communication terminal, for the stored subscriber-individual and/or terminal-individual information to be transferred to the respective communication system-internal communication terminal.

In an advantageous embodiment of the invention the entered and/or transferred subscriber-individual and/or terminal-individual information can preferably be visually or audibly output to the further communication terminal. Provided for example the subscriber-individual and/or terminal-individual information involves name information of a subscriber of the second communication, this name information can be output at a display or via a loudspeaker of the further communication terminal, which allows the subscriber of the further communication terminal to be informed in a convenient manner about the name of a communication partner.

In particular a telephone, a data terminal, a data processing device assigned to the communication terminal—preferably a PC or a PDA (PDA: Personnel Digital Assistant), a communication application—for example a so-called soft client—a data processing device and/or a combination of such terminals can be provided as the first or as the further communication terminal. For combinations of terminals of this type a common environment advantageously exists in the terminals, for example on a common desktop, so that it can be operated alternately or simultaneously by a subscriber.

The subscriber-individual and/or terminal-individual information can be entered by means of a text or voice input means, with a conversion of text information by means of voice synthesis into tone information, a conversion of handwritten information by means of handwriting recognition into text information or a conversion of speech information by means of speech recognition into text information able to be provided before storage in the assignment table as part of a further increase in convenience for the subscriber.

Over and above this, in a further advantageous embodiment of the invention, there can be provision for the transferred subscriber-individual and/or terminal-individual information to be changed, supplemented or deleted and thereby corrected at the further communication terminal by a further input. This changed and/or supplemented subscriber-individual and/or terminal-individual information can be stored in the assignment table of the communication system or the deleted subscriber-individual and/or terminal-individual information can be removed from the assignment table of the communication system. This provides a simple method of correcting incorrect entries in the assignment table.

The method in accordance with one of the above embodiments or a combination of these is advantageous in allowing information to be displayed to subscribers of communication terminals within the communication system, which then supports them in making the connection. It is further advantageous that all communication terminals within the communication system are shown the same information as soon as they communicate with the same second communication terminal via a connection. In addition it proves advantageous for the displayed information to be able to be modified, enhanced and/or updated by some or all of the internal communication terminals within the communication system.

BRIEF DESCRIPTION OF THE DRAWINGS

An exemplary embodiment of the invention will be explained in more detail below with reference to a drawing.

The schematic diagram depicted in the figure shows FIG. 1 a communication system with a communication terminal for executing the inventive method, as well as an external terminal coupled to the communication system.

DETAILED DESCRIPTION OF INVENTION

FIG. 1 shows a schematic diagram of a communication system for real-time voice communication with a private branch exchange PBX shown as a rectangle and a first telephone connected via an access line AL to the private branch exchange PBX as a first communication terminal. The communication system for example represents a private communication network in which a number of telephones—including the first telephone EG1—are able to be connected to the private branch exchange PBX. It is further assumed that the private branch exchange PBX can be connected via a trunk line TL to a second telephone EG2 as a second communication terminal of a public communication network KN. The second telephone EG2 is assigned a telephone number RUNO as its address. This telephone number RUNO is 089 303 2274 below.

Furthermore a private branch exchange database PBXDB is connected to the private branch exchange PBX, in which PBX-internal subscriber, terminal and/or connection-related data is stored. Also coupled to the private branch exchange PBX is a CTI application CTIA (CTI: Computer Telephony Integration) and coupled to this in its turn is a database DB for storing an assignment table ZTAB, with a telephone number RUNO and additional information such as name information, display information or subscriber-individual and/or terminal-individual information being stored in a data record of the assignment table ZTAB in each case.

The CTI application CTIA, the database DB and a personal computer PC are linked to each other via a local network LAN indicated by a dashed line. The coupling between the CTI application CTIA and the private branch exchange PBX takes the form of a CTI interface CTIS shown as a solid line between these two components, in this case especially by means of the CSTA protocol (CSTA: Computer Supported Telecommunications Application) standardized by the ECMA (European Computer Manufacturers Association), via which the CTI application CTIA provides information about the call processing states and state transitions of the private branch exchange. The CTI application CTIA can be implemented on a separate computer, in the private branch exchange PBX or on the personal computer PC.

The first telephone EG1 is shown in FIG. 1 as a key telephone, with a keypad ZF and a display D as well as with a telephone handset H.

The personal computer PC, together with the first telephone EG1, jointly form the first communication terminal of a subscriber. Both devices are located at a common user PC not shown in the figure. The application APPL running on the first personal computer PC is shown as a rectangle within the personal computer PC. A monitor M of the personal computer PC is indicated by a rectangle, with outputs of the application APPL being visualized on the monitor M within an application window APPLWIN shown as a rectangle.

Display outputs of the application APPL are displayed in the application window APPLWIN, with the following window components being displayed in the exemplary embodiment in a graphical user interface:

A text field labeled with the text "Telephone number" for output of a telephone number of a caller to the first telephone EG1, A name input field NAMEF labeled with the text "Name" for input of a name assigned to the telephone number, A text field labeled with the text "last change" for output of a date and of a user name who has entered the text into the name field NAMEF on the specified date—possibly at another PC—and An action button AB labeled with the text "Change" for starting an action for allocation of the entered name to the displayed telephone number by the subscriber or the user of the personal computer PC.

The application APPL is for example an application running permanently on the personal computer PC, which receives messages for example via a so-called socket of the computer from the CTI application CTIA and can react to these, as well as being able to write information from this application into the application APPLWIN, with the CTI application CTIA being able to initiate an activation or start of the application APPL.

The private branch exchange PBX and the two telephones EG1, EG2 are provided for circuit-switched real-time communication. As an alternative to the fixed network telephones shown, there can also be a telephone application running on the personal computer—a so-called soft client—or mobile communication terminal or these can be provided. The private branch exchange PBX can also be based on a packet-oriented principle, with a packet-oriented private branch exchange PBX or also a gatekeeper, gateway or communication server able to be integrated.

Messages or connections between the components mentioned above are identified by V, Q, I, LS shown by lines with double-ended arrows.

The values shown in FIG. 1 for the assignment table ZTAB, for the contents of the application window APPLWIN and for the content of the display D of the first telephone EG1 represent the values in an intermediate step of the method explained below. As an initial situation for the system state shown in FIG. 1 it is assumed that no entry is present in the assignment table ZTAB for the telephone number RUNO, that the application window APPLWIN is not visible on the monitor and that an output of an idle state of the first telephone EG1 is shown on the display D.

In FIG. 1 a connection setup between the first telephone EG1 and the second telephone EG2 is initiated. In this case it is of no significance which of the two telephones EG1, EG2 has initiated the connection setup V and whether a connection V has already been through-connected or is still being set up. Since the second telephone EG2 is outside of the communication system, formed from the private branch exchange PBX, the first telephone EG1, the CTI application CTIA, the database DB, PBXDB and further communication terminals not shown, within the framework of the connection V only the telephone number RUNO of the second telephone EG2 is transferred to the private branch exchange PBX. Further, for example textual information, such as a name of a subscriber of the second telephone EG2 is not transferred, since in the present exemplary embodiment it is assumed that the communication network KN cannot transfer such textual information and/or no name is assigned to the second telephone EG2 in the communication network KN.

The connection V is set up by the private branch exchange PBX between the first telephone EG1 and the second telephone EG2. The telephone number RUNO of the second telephone EG2 contained in the signaling of the connection V and transferred by means of CLIP is detected by the private branch exchange PBX and transferred to the first telephone EG1 and then shown there on the display D.

Furthermore in the private branch exchange PBX the telephone number RUNO is checked to see whether the second telephone EG2 involves a communication system-internal or a communication system-external communication terminal. If a communication system-internal communication terminal is involved—not the case in the exemplary embodiment—it is assumed for the exemplary embodiment that configured name information assigned to the communication terminal is available in the private branch exchange database PBXDB. The inventive assignment of subscriber-individual and/or terminal-individual information to address information and the input of characters to form the subscriber-individual and/or terminal-individual information within the framework of a connection is in this case suppressed or blocked, since the configured name information from the private branch exchange database PBXDB is preferably output and this is not to be changed. In the present exemplary embodiment on the other hand the second telephone EG2 involves a communication system-external communication terminal, for which name information to be displayed on the display D will be determined as subscriber and/or terminal-individual information via the assignment table ZTAB.

For determination of name information assigned to the telephone number RUNO for the second telephone EG2 a query connection Q is established by the private branch exchange PBX directly or via the CTI application CTIA to the database DB. Via this query connection Q a database query is issued to database DB with the telephone number RUNO transferred in the connection V as its search parameter. This search parameter is used to search through the database DB in the assignment table ZTAB for an entry. Since no entry can be found for the telephone number RUNO in the assignment table ZTAB a negative acknowledgement is transferred to the private branch exchange PBX, in the query connection Q. Optionally a negative acknowledgement is also transferred to the first telephone EG1. Name information assigned to the telephone number RUNO is not signaled to the first telephone EG1. There is therefore no output of such name information at the first telephone EG1.

As a result of the initiation of the connection V, the CTI application CTIA is informed via the private branch exchange PBX about this connection V to be established by means of a CTI message. This CTI message for CTI application CTIA within the framework of a call connection I from the private branch exchange PBX to the personal computer PC preferably includes the telephone number RUNO and possibly further private branch exchange and/or connection-specific data.

The CTI application CTIA records the data transferred in the CTI message. In a subsequent method step—not shown—the CTI application CTIA can determine the personal computer PC assigned to the first telephone EG1 and/or the assigned application APPL. In addition an attempt is made by the CTI application CTIA to determine a data record from the assignment table ZTAB for the telephone number RUNO—not shown. Since the assignment table ZTAB in this execution step does not include any entry for the telephone number RUNO, no data record can be found for the telephone number RUNO.

Following on from this, a message is transferred by the CTI application CTIA together with information determined, intended for display on the personal computer PC, to application APPL of the personal computer PC within the framework of the call connection. The application APPL is in this case a permanently-running process or is started by the CTI application CTIA or woken up by said application. The application window APPLWIN is subsequently opened and shown on the monitor M. If so desired, the application APPL could now request further subscriber/or connection-related data via the CTI application CTIA or the database DB—not shown.

The application APPL is addressed by the CTI application CTIA for example via a processor IP address determined for the personal computer PC and a predetermined port number. The application APPL is activated for example via a so-called "Remote Procedure Call" RPC.

The telephone number RUNO as well as an empty name entry field NAMEF are subsequently displayed in the application window APPLWIN of the activating application APPL. A user or the subscriber is then given control of the application window APPLWIN. The user of the personal computer PC and of the first telephone EG1 can then enter a text into this name entry field NAMEF, preferably the name of the subscriber of the second telephone EG2.

An entry into the name entry field NAMEF by the user of the personal computer PC and of the first telephone EG1 can be made during different stages of the connection V, for example on setup, after through-connection but also after ending of the connection V.

As a result of the actuation of the change button AB the application APPL can execute first validity checks for input and subsequently transmit the telephone number RUNO and the entered character string into the name entry field NAMEF via read/write connection LS to database DB and to assignment table ZTAB. A data record is formed and stored in the assignment table TZAB from the transferred data. An existing data record for the telephone number RUNO would be overwritten or updated.

As well as the telephone number RUNO of the second telephone EG2 and the name information NAME of the subscriber of the second telephone EG2, the name of the user entering the data and the date of the entry will be stored by the assignment table ZTAB—these last two items not being shown.

After storage of the data record the name information NAME is transferred via the call connection I to the private branch exchange PBX. The private branch exchange PBX transmits this name information NAME to the first telephone EG1 for display on its display D and, to distinguish it from the configured communication system-internal name information, appends an additional character string "(external)" to the name information NAME. The name information NAME is subsequently displayed together with the additional character string in the Display D.

The method steps specified here make it possible to allocate freely-specifiable additional information in addition to the telephone number centrally to a communication system-external subscriber or to a communication terminal, and to display this at a communication system-internal communication terminal. How this stored information is made available for further connections and for further communication system-internal communication terminals for display will be described below.

The requirement here, as described above, is for the status table ZTAB to include an entry for the telephone number RUNO. The telephone number RUNO of the second telephone EG2 is 089 303 2274 and the name information NAME assigned in the assignment table ZTAB of the subscriber of the second telephone EG2 is "Kurt Gross". The entry in the assignment table ZTAB was last created or changed by the subscriber "Heinz Klein" on 24.8.2005.

For a new connection setup V from the second telephone EG2 to the first telephone EG1 or to a further telephone of the communication system, the telephone number RUNO will be transferred to the private branch exchange PBX and onwards to the first telephone EG1 for display on the display D. Using the mechanisms already described the telephone number RUNO is recorded by the private branch exchange PBX and the assignment table ZTAB queried for this telephone number RUNO. In this case an entry in the assignment table ZTAB is found and recorded for the telephone number RUNO. The name information "Kurt Gross" assigned to the recorded entry of the telephone number RUNO is read out and returned to the private branch exchange PBX. Subsequently the name information is modified by appending the character string "(external)" by the private branch exchange PBX and transferred to the first telephone EG1 for display on the display D.

This method step thus enables both the telephone number RUNO and also subscriber-individual and/or terminal-individual information, namely "Kurt Gross (external)" to be output. By the addition of the character string "(external)" the user is informed that the output name information is not configured, and is thus not very reliable name information, but is name information entered by one or many users or subscribers of the communication system, which may be involuntarily or intentionally subject to errors.

To correct erroneous entries in the assignment table ZTAB the user of the first telephone EG1 has the option, in the method step described below, of editing the displayed name information NAME. To provide means for executing such a correction of the stored name information NAME the data determined from the assignment table ZTAB is transferred for the telephone number RUNO in a similar manner to the previously explained method step via the call connection I to application APPL and displayed in the application window APPLWIN. In this window, as shown in FIG. 1, the following character string is output:

| | |
|---|---|
| Telephone number: | 089 303 2274 |
| Name: | Kurt Gross |
| Last change | on 24 Aug. 2005 |
| | by Heinz Klein |

The name entry field NAMEF with the contents "Kurt Gross" is an overwritable input field in this case. The user can enter corrections or additions in this field if he deems the name information to be incorrect or in need of improvement. For example the user can change the name information NAME "Kurt Gross" into the character string "Kurt Georg Gross" and confirm and end the changes by actuating the change button AB.

The personal computer PC then establishes the read/write connection LS to the database DB in order to update or to overwrite the stored data record assigned to the telephone number RUNO in the assignment table ZTAB. In particular the entered name information, the date of the last change and the name of the user who has made the change are updated.

After a positive confirmation from the database DB, the changed name information is transferred via the call message I from the personal computer PC to the private branch exchange PBX. In the private branch exchange PBX the character string "(external)" is then supplemented with the name information and transferred to the first telephone EG1 for output on the display D. In the present exemplary embodiment this is the character string "Kurt Georg Gross (external)".

The method is advantageous in that it enables communication system-wide subscriber-individual and/or terminal-individual information especially for communication system-external communication partners to be entered, corrected and stored by the user of the communication system. This means that companies which repeatedly communicate with the same external communication partners and use different contact persons in the company to undertake this communication, can assign information to these external communication partners which will be displayed to the users of system-internal communication terminals. Furthermore, as well as the name information or as an alternative to the name information, further information can be entered, stored and displayed, which will be displayed to the communication system-internal users on a connection setup or transferred to the applications on the personal computers for further processing.

For example a logging system can be installed on a personal computer in which the user can enter notes for each call made in a type of log. These notes can be stored in the assignment table ZTAB and can be displayed for a further connection setup together with the name information.

Advantageously a data record can be assigned time information in the assignment table ZTAB—especially the date of the last change mentioned above—and this time information can be compared with reference time information. The reference time information is for example the current date minus one year. As soon as this reference time information is greater than the stored time information, more than a year has elapsed since the last change was made to the data record. A programmed action can then be executed. For example the display of the name information NAME can be shown marked or modified in the Display D to indicate to the user that the displayed name information NAME may be out of date. Furthermore an output "the entry may be out of date, please confirm that the entry is correct" can be displayed in the application window APPLWIN. This record can be marked as valid again by pressing an actuation button in the application window APPLWIN. The data is then given new time information—the current date—and is regarded as current.

In addition a routine can be executed at regular intervals for all data records of the assignment table ZTAB in order to read out the respective time information and compare it with further reference time information. If the comparison detects that the data record for example has been stored unchanged for more than two years, the validity of the record has not been updated and the data record has not been output, the routine can delete the associated data record from the assignment table ZTAB. This enables non-updated, out-of-date or seldom-used data records to be deleted and thus the size the assignment table ZTAB to be restricted.

While the invention in the exemplary embodiment has been explained with reference to voice terminals, the communication terminals involved can also be video or multimedia terminals or data terminals such as faxes. Furthermore the first telephone EG1 can be a software telephony application on the personal computer PC. Furthermore a circuit-switched or a packet-switched method can be employed as the communication method and the telephones EG1, EG2 can be circuit-switched terminals or packet-switched terminals.

In addition the assignment table ZTAB, as an alternative to the embodiment shown, can be stored in a central memory or in the private branch exchange database PBXDB of the communication system.

Furthermore the additional information such as name information cannot only be entered from the personal computer PC but also directly from the first telephone EG1 into the assignment table ZTAB. In this case however a communication terminal is to be provided with which it is possible to enter information such as names. Furthermore an input procedure is to be provided, which within the framework of the connection setup, during the connection or after the connection, allows the input of additional information and the storage of this information in the assignment table.

The invention claimed is:

1. Method for assigning information to address information at a first communication terminal of a communication system, the communication system also comprising a call routing device comprising one of a phone switching system, a router, a gatekeeper and a private branch exchange for connecting calls to the first communication terminal, the method comprising:
   a second communication terminal calling the first communication terminal, the second terminal being external to the communication system and a network in which the communication system is located;
   the call routing device routing the call to the first communication terminal, the routing of the call to the first terminal comprising:
      the call routing device obtaining a telephone number of the second communication terminal,
      the call routing device querying a database accessible to the call routing device to determine whether a name is associated with the telephone number of the second communication terminal, and
      when the name is not found to be associated with the telephone number of the second communication terminal in the database, the call to the first communication terminal being routed such that the telephone number of the second communication terminal is displayable by the first communication terminal;
   the first communication terminal providing name input for storage in the database so that the name associated with the telephone number of the second communication terminal is stored within the database and associated with the telephone number of the second communication terminal;
   the second communication terminal calling a third communication terminal of the communication system after the name input was provided to the database via the first communication terminal, the third communication terminal being within the network;
   the call routing device querying the database to determine the name associated with the telephone number of the second communication terminal; and
   the call routing device connecting the call from the second communication terminal to the third communication terminal such that the telephone number of the second communication terminal and the name associated with the telephone number of the second communication terminal in the database are output at the third communication device.

2. The method of claim 1 wherein the first communication terminal provides the name input during the call with the second communication terminal.

3. The method of claim 2 further comprising the third communication terminal providing updated name input for storage in the database so that an updated name associated with the telephone number of the second communication terminal is stored within the database and associated with the telephone number of the second communication terminal.

4. The method of claim 3 further comprising:
the second communication terminal calling the first communication terminal of the communication system after the updated name input was provided to the database via the third communication terminal;
the call routing device querying the database to determine the name associated with the telephone number of the second communication terminal;
the call routing device connecting the call from the second communication terminal to the first communication terminal such that the telephone number of the second communication terminal and the updated name associated with the telephone number of the second communication terminal in the database are output at the first communication device.

5. The method of claim 2 further comprising providing additional input for storage within the database via the third communication terminal, the additional input being provided for being associated with the telephone number of the second communication terminal in the database.

6. The method of claim 5 further comprising outputting the additional input visually or audibly at a further communication terminal within the network.

7. The method of claim 1 wherein the first communication terminal is a telephone.

8. The method of claim 1 further comprising outputting the name at the first communication terminal after the name input is stored in the database.

9. The method of claim 8 wherein the outputted name is output in a manner which distinguishes it from other output information.

10. The method of claim 1 wherein the name input is made by voice input or text input.

11. The method of claim 1 further comprising checking the database to determine whether the name associated with the telephone number of the second communication terminal and the telephone number of the second communication terminal should be deleted from the database.

12. The method of claim 1 wherein predetermined time information is stored in the database when the name input is stored in the database and after a predetermined time identified by the predetermined time information elapses the name input is deleted or shown marked.

13. The method as claimed in claim 1 wherein the call routing device is the private branch exchange.

14. The method as claimed in claim 1 wherein the call routing device is the phone switching system.

15. A communication system comprising:
a first communication terminal within a network; and
a call routing device within the network, the call routing device comprising one of a phone switching system, a router, a gatekeeper and a private branch exchange for connecting calls to the first communication terminal; and
the call routing device routing a call from a second communication terminal external to the network to the first communication terminal, the routing of the call to the first terminal comprising:
the call routing device obtaining a telephone number of the second communication terminal,
the call routing device querying a database accessible to the call routing device to determine whether a name is associated with the telephone number of the second communication terminal, and
when the name is not found to be associated with the telephone number of the second communication terminal in the database, the call to the first communication terminal being routed such that the telephone number of the second communication terminal is displayable by the first communication terminal;
the first communication terminal providing name input for storage in the database so that the name associated with the telephone number of the second communication terminal is stored within the database and associated with the telephone number of the second communication terminal;
the call routing device routing a call from the second communication terminal external to the network to a third communication terminal within the network after the name input was provided to the database via the first communication terminal, the third communication terminal being within the network;
the call routing device querying the database to determine the name associated with the telephone number of the second communication terminal; and
the call routing device connecting the call from the second communication terminal to the third communication terminal such that the telephone number of the second communication terminal and the name associated with the telephone number of the second communication terminal in the database are output at the third communication device.

16. The system of claim 15 wherein the call routing device is the phone switching system.

17. The system of claim 15 wherein the call routing device is the private branch exchange.

18. The system of claim 15 wherein the fist communication terminal is a telephone.

19. The system of claim 15 wherein the database is within the network.

20. The system of claim 15 wherein the third communication terminal provides updated name input for storage in the database so that an updated name associated with the telephone number of the second communication terminal is stored within the database and associated with the telephone number of the second communication terminal;
the call routing device routing a call from the second communication terminal after the updated name input was provided to the database via the third communication terminal;
the call routing device querying the database to determine the name associated with the telephone number of the second communication terminal;
the call routing device connecting the call from the second communication terminal to the first communication terminal such that the telephone number of the second communication terminal and the updated name associated with the telephone number of the second communication terminal in the database are output at the first communication device.

* * * * *